Oct. 4, 1966  L. C. FLOWERS  3,276,417
PRESSURE INDICATING APPARATUS FOR A PNEUMATIC TIRE
Filed Aug. 11, 1965
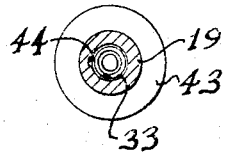
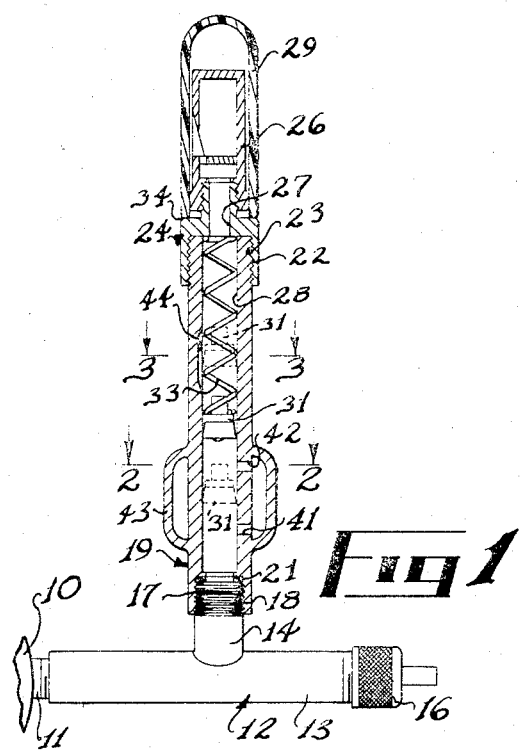
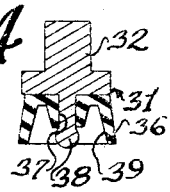
INVENTOR.
Louis C. Flowers
BY
Jennings, Carter & Thompson
Attorneys

United States Patent Office 3,276,417
Patented Oct. 4, 1966

3,276,417
PRESSURE INDICATING APPARATUS FOR A
PNEUMATIC TIRE
Louis C. Flowers, Rte. 2, Box 793F, Bessemer, Ala.
Filed Aug. 11, 1965, Ser. No. 478,931
1 Claim. (Cl. 116—34)

This invention relates to pressure indicating apparatus for a pneumatic tire and more particularly to a safety device which shall embody means to convey air to a warning element upon a predetermined decrease in pressure within the tire.

An object of my invention is to provide pressure indicating apparatus of the character designated which is positive in operation to actuate the warning element immediately upon a predetermined decrease in pressure within the tire.

A more specific object of my invention is to provide pressure indicating apparatus for a pneumatic tire which shall include a piston element that is mounted for sliding movement within a bore having by-pass means associated therewith, together with improved means to assure that there is no coherence or sticking of the piston relative to the bore.

A further object of my invention is to provide indicating apparatus for a pneumatic tire of the character designated which shall include a sleeve-like member surrounding the by-pass ports, thus assuring free movement of the air around the piston upon a predetermined decrease in air pressure within the tire.

A further object of my invention is to provide pressure indicating apparatus of the character designated which shall include improved means to exhaust air from the tire upon an increase in air pressure within the tire above a predetermined amount.

A still further object of my invention is to provide pressure indicating apparatus of the character designated which shall be extremely simple of construction, economical of manufacture and one which may be readily attached to conventional type valve stems.

As is well known in the art to which my invention relates, many devices have been proposed to warn the operator of a vehicle when a tire pressure has decreased below a predetermined amount. Difficulties have been encountered with such devices due to the fact that they require the rupture of sealing members or the movement of complicated mechanisms relative to each other to permit the escape of air to energize a warning device such as a whistle or the like. With such mechanisms, the moving parts thereof do not move freely relative to each other due to the fact that there is coherence between the moving parts brought about by the mechanism remaining in a certain position for such a long period of time prior to being actuated.

To overcome the above and other difficulties, I provide a relatively simple device which is adapted to be connected to a valve stem of a pneumatic tire whereby upon a predetermined decrease in pressure within the tire, a piston-like member moves immediately to a position to by-pass air directly to a warning element, such as a whistle. As the air pressure continues to decrease, the piston moves to another position to prevent further escape of air. Also, the piston moves to a third position upon an increase in pressure above a predetermined amount whereby air is exhausted from the tire.

Apparatus embodying features of my invention is illustrated in the accompanying drawing, forming a part of this application, in which:

FIG. 1 is a side elevational view, partly broken away and in section showing my improved pressure indicating apparatus attached to a valve stem;

FIG. 2 is a sectional view taken along the line 2—2 of FIG. 1;

FIG. 3 is a sectional view taken generally along the line 3—3 of FIG. 1; and

FIG. 4 is an enlarged, sectional view showing the piston and the annular rubber-like sealing member carried thereby.

Referring now to the drawing for a better understanding of my invention, I show a fragment of a pneumatic tire 10 having a conventional type valve stem 11. Secured threadedly to the valve stem 11 is a second valve stem 12 having branches 13 and 14. The branch 13 is provided with the usual check valve herein for introducing air into the tire. Such a check valve is shown at 16 in the Crosby Patent No. 1,450,769, dated April 3, 1923. Also, the end of the branch 13 is closed by a suitable cap or cover member 16. The branch 14 is threaded as at 17 for receiving internal threads 18 provided at one end of a cylindrical housing 19, as shown in FIG. 1. Preferably, the end of the housing 19 engaging the threads 17 is counter-bored to provide a shoulder 21 which is in position to engage the end of the branch 14, as shown.

The end of the cylindrical housing 19 opposite the end thereof connected to the branch 14 is provided with external threads 22 which are adapted to receive internal threads 23 carried by a cylindrical member 24. A whistle indicated generally at 26 is provided within the cylindrical member 24, as shown. Also, an opening 27 is provided in the cylindrical member 24 in position to communicate with the bore of the cylindrical member 19 indicated generally at 28. To prevent dust and other foreign materials from entering the whistle, a suitable cover member 29 may be provided to telescope over the whistle unit 26, as shown in FIG. 1.

Mounted for sliding movement within the bore 28 of the cylindrical member 19 is a piston indicated generally at 31. The end of the piston 31 nearest the cylindrical member 24 is provided with a reduced diameter portion 32, which is adapted to receive one end of a compression spring 33, the other end of the compression spring 33 engages a spring abutment 34 which is defined by an annular, in-turned flange carried by the cylindrical member 24. The compression spring 33 is thus in position to urge the piston 31 toward the branch 14 of the valve stem 12.

As shown in FIG. 4, the piston 31 carries a rubber-like annular sealing member 36 which is adapted to slidably engage the inner surface of the bore 28. A centrally disposed opening 37 is provided within the annular sealing member 36 in position to receive a projection 38 carried by the remainder of the piston unit 31. To prevent separation of the resilient sealing member 36 from the projection 38, the end of the projection 38 is slightly enlarged, as shown in FIG. 4. An annular recess 39 is provided in the annular sealing member 36, as shown. The sides of the recess 39 flare outwardly and the outer surface of the rubber-like sealing member 36 flares outwardly, as shown, to provide an annular lip which is disposed to engage the inner surface of the bore 28. By providing the annular, outwardly flaring lip on the sealing member 36, which extends toward the branch 14 of the valve stem 12, the air pressure within the bore 28 causes the outwardly flaring lip of the sealing member 36 to be forced firmly against the adjacent surface of the bore 28. An anti-seize lubricant is applied between the contact surface of the sealing member 36 and the inner surface of the bore 28 to prevent coherence therebetween. Accordingly, the piston moves freely and instantaneously in response to a differential in pressure at opposite sides thereof whereby there is no sticking of the piston 31 to the inner surface of the bore 28 after the apparatus has been in use for a long period of time.

Axially spaced openings 41 and 42 are provided in the housing 19, as shown in FIG. 1. A sleeve-like member 43 surrounds the housing 19 and is of a length to span both of the openings 41 and 42. The ends of the sleeve-like member 43 are turned inwardly and secured to the outer surface of the cylindrical housing 19, as shown in FIG. 1, to provide a closed chamber outwardly of the housing 19 which is in communication with both of the openings 41 and 42. Accordingly, upon movement of the piston 31 from the solid line position shown in FIG. 1 to the lower dotted line position, the piston 31 is positioned intermediate the openings 41 and 42 to thus permit air to by-pass the piston 31. That is to say, upon a pre-determined decrease in pressure within the tire 10, the piston 31 moves to the lowermost dotted line position whereupon the air flows outwardly through the branch 14 into the bore 28 and thence outwardly through opening 41 into the sleeve-like member 43. The air flows from the sleeve-like member 43 through opening 42 back into the bore 28 and then flows outwardly through opening 27 to actuate the whistle 26 to thus warn the operator of a vehicle that the pressure within a tire has decreased a predetermined amount. As the air within the tire 10 decreases further, the piston 31 moves to a position below the opening 41 to thus prevent further escape of air from the tire.

As shown in FIGS. 1 and 3, an axially extending recess 44 is provided along the inner surface of the bore 28 in spaced relation to opening 42 and the cylindrical housing 24. The recess 44 is of a size and length to permit air to by-pass the piston 31 while the piston is in the uppermost dotted line position shown in FIG. 1. That is to say, when the pressure within the tire 10 increases to a predetermined point, the piston 31 is forced outwardly against the tension of the spring 33 whereby it assumes the uppermost dotted line position shown in FIG. 1 to thus permit the escape of air through the recess 44.

From the foregoing description, the operation of my improved apparatus for a pneumatic tire will be readily understood. The valve stem 12 is connected to the conventional type valve stem 11 whereby air may be introduced into the tire through the branch 13. The housing 19 is secured to the branch 14 whereupon the pressure within the bore 28 causes the piston 31 to move to the solid line position shown in FIG. 1 during normal operation of the apparatus. As long as normal air pressure exists within the tire 10, the piston 31 remains between the opening 42 and the recess 44. Upon a decrease in air pressure to a predetermined amount, the piston 31 moves to the lowermost dotted line position between the openings 41 and 42. The application of the anti-seize lubricant between the contact surface of the piston and the inner surface of the bore 28 prevents coherence therebetween whereby the piston moves freely and instantaneously in response to a differential in pressure at opposite sides of the piston. That is to say, even though the piston 31 has been in a set position for a rather long period of time, the instant the pressure within the bore 28 decreases or increases at one side of the piston 31, the piston moves instantaneously whereby there is no lag in movement of the piston. Without the anti-seize lubricant between the piston and the bore 28, the piston would tend to stick in the solid line position shown in FIG. 1 whereby it would not move until the pressure within the tire had decreased a substantial amount to thus cause damage to the tire or cause the piston to move completely past both openings 41 and 42, whereby there would be no actuation of the warning device 26. As the piston 31 moves to a position between the openings 41 and 42, air escapes through the opening 41 into the chamber defined by the sleeve-like member 43, whereupon the air then moves outwardly through the opening 42 back into the bore 28 and then flows through opening 27 to actuate the whistle 26. The whistle thus continues to be actuated until the pressure within the tire 10 decreases sufficiently for the piston to move beyond the opening 41 to a position adjacent the end of the branch 14. The piston 31 thus prevents any further escape of air from the valve stem 12. In the event the pressure within the tire increases beyond a predetermined amount, the piston 31 moves to the uppermost dotted line position shown in FIG. 1, whereupon the piston is opposite the elongated, axially extending recess 44. In this position, air by-passes the piston 31 and escapes through the opening 27 to thus prevent an unsafe build-up of pressure within the tire.

From the foregoing, it will be seen that I have devised an improved indicating apparatus for a pneumatic tire. By providing an anti-seize lubricant between the contact surface of the piston and the bore of the housing, the piston moves instantaneously in response to a change in air pressure within the tire. Accordingly, the piston moves to a position to permit the air to by-pass the piston and actuate the whistle 26 immediately upon a predetermined decrease in air pressure within the tire. There is thus no lag in operation of the apparatus and the whistle continues to be energized until the pressure within the tire decreases sufficiently for the piston to move to a position adjacent the branch 14 and beyond the opening 41. Also, by providing an annular chamber around the chamber 19 which encases both of the openings 41 and 42, air is free to by-pass the piston and at the same time the construction of the apparatus is greatly simplified. Furthermore, by providing the elongated, axially extending recess 44 within the bore 28, air is free to by-pass the piston upon a predetermined increase in pressure within the tire.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claim.

What I claim is:

In pressure indicating apparatus for a pneumatic tire having a valve stem:

(a) a housing having a bore therethrough disposed to be connected at one end to the valve stem, (b) warning means carried by the other end of said housing and communicating with said bore to be actuated by air upon the escape of air through said other end of the bore, (c) a piston mounted for sliding movement within said bore and carrying an annular outwardly flaring rubber-like sealing member disposed adjacent the inner surface of said bore and extending toward said one end of the housing, (d) there being an annular recess in the end of said annular, rubber-like member nearest said one end of said housing defining an annular lip which is urged by air pressure within the tire toward the inner surface of said bore, (e) an anti-seize lubricant between said sealing member and the inner surface of said bore preventing coherence therebetween whereby said piston moves freely and instantaneously in response to a differential in pressure at opposite sides thereof, (f) a compression spring urging said piston toward said one end of the housing to move said piston immediately and positively toward said one end upon a predetermined decrease in pressure within the tire, (g) there being axially spaced openings through said housing in communication with said bore and in position for said piston to move between said openings upon said predetermined decrease in pressure within the tire, (h) a sleeve-like member surrounding and spaced from said housing communicating said openings with each other to convey air around said piston to said warning means at said other end of the housing upon said predetermined decrease in pressure within the tire,
(i) means adjacent opposite ends of said sleeve-like member defining a seal between the outer surface of said housing and the ends of said sleeve-like member,
(j) said piston being disposed to move to a position between said one end of said housing and the opening nearest thereto upon a predetermined decrease in pressure within the tire to prevent further escape of air from the tire, and
(k) there being an axially extending recess along the inner surface of said bore, said recess being of a length and in position to by-pass air around said piston upon a predetermined increase in pressure within said bore to position said piston opposite said recess.

References Cited by the Examiner

UNITED STATES PATENTS

| | | | |
|---|---|---|---|
| 1,078,061 | 11/1913 | Polo | 116—34 |
| 1,091,016 | 3/1914 | Polo | 116—34 |
| 1,289,451 | 12/1918 | Hougen | 116—34 |
| 1,297,239 | 3/1919 | Potter | 116—34 |
| 1,411,714 | 4/1922 | Durney et al. | 116—34 |
| 1,450,769 | 4/1923 | Crosby | 116—34 |
| 1,548,470 | 8/1925 | Kennedy | 116—34 |
| 2,137,495 | 11/1938 | Kershaw | 116—65 |
| 3,093,108 | 6/1963 | Wells et al. | 116—34 |

LOUIS J. CAPOZI, *Primary Examiner.*